(12) United States Patent
Mason

(10) Patent No.: US 12,140,236 B2
(45) Date of Patent: Nov. 12, 2024

(54) DUAL UNION DRAIN VALVE WITH REVERSIBLE CHECK INSERTS

(71) Applicant: NIBCO Inc., Elkhart, IN (US)

(72) Inventor: Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 99 days.

(21) Appl. No.: 18/107,287

(22) Filed: Feb. 8, 2023

(65) Prior Publication Data
US 2024/0263712 A1    Aug. 8, 2024

(51) Int. Cl.
*F16K 15/06*    (2006.01)
*E03C 1/12*    (2006.01)
*F16K 15/02*    (2006.01)

(52) U.S. Cl.
CPC ........... *F16K 15/06* (2013.01); *E03C 1/12* (2013.01); *F16K 15/021* (2013.01); *Y10T 137/7837* (2015.04)

(58) Field of Classification Search
CPC .......... F16K 15/06; F16K 15/021; E03C 1/12; Y10T 137/7837
See application file for complete search history.

(56) References Cited

U.S. PATENT DOCUMENTS

| | | | | |
|---|---|---|---|---|
| 2,345,140 A | * | 3/1944 | Mccollum | B64D 13/08 137/881 |
| 2,569,857 A | * | 10/1951 | Jaegle | B01F 35/712 248/89 |
| 3,333,699 A | | 8/1967 | Bliss et al. | |
| 3,770,050 A | * | 11/1973 | Nakanishi | F25J 5/00 165/DIG. 100 |
| 3,778,029 A | | 12/1973 | Baker | |
| 3,858,911 A | * | 1/1975 | Martin | F16L 55/00 285/422 |
| 4,080,693 A | * | 3/1978 | Pruitt | A01N 1/00 27/24.1 |
| 4,129,149 A | | 12/1978 | Brehmer et al. | |

(Continued)

FOREIGN PATENT DOCUMENTS

| | | |
|---|---|---|
| CN | 205781020 | 12/2016 |
| CN | 207195715 | 4/2018 |

(Continued)

OTHER PUBLICATIONS

Industrial Specialties MFG., "Three-Way Ball Valve Flow Patterns," https://www.industrialspec.com/about-us/blog/detail/three-way-valve-t-port-I-port-flow-patterns/ (2018).

(Continued)

*Primary Examiner* — Umashankar Venkatesan
*Assistant Examiner* — Frederick D Soski
(74) *Attorney, Agent, or Firm* — PRICE HENEVELD LLP

(57) ABSTRACT

A dual union drain valve assembly has one or more reversible check valve inserts in the fitting(s) that are coupled to the drain valve body. The coupling of the fittings to the drain valve body is done using union couplings permitting the easy installation and/or reversal of the check valve insert(s). In addition, the union couplings permit removal of the dual union drain valve assembly from the surrounding plumbing system for service or replacement of the dual union drain valve assembly.

20 Claims, 7 Drawing Sheets

(56) References Cited

U.S. PATENT DOCUMENTS

| | | | | |
|---|---|---|---|---|
| 4,195,812 | A * | 4/1980 | Norcross | F16L 37/36 |
| | | | | 184/105.3 |
| 4,449,694 | A * | 5/1984 | Hobart | F16K 5/0668 |
| | | | | 251/315.13 |
| 5,154,232 | A * | 10/1992 | McHugh | A62C 35/68 |
| | | | | 169/5 |
| 5,433,243 | A | 7/1995 | Griswold et al. | |
| 5,775,365 | A * | 7/1998 | Hayden | E03F 7/04 |
| | | | | 137/369 |
| 5,785,074 | A * | 7/1998 | Kieper | F16K 5/0605 |
| | | | | 137/625.22 |
| 5,971,014 | A * | 10/1999 | Duren | E03C 1/12 |
| | | | | 137/526 |
| 6,302,446 | B1 | 10/2001 | Spears et al. | |
| 6,655,412 | B2 | 12/2003 | Reck | |
| 7,306,010 | B2 * | 12/2007 | Gruener, Sr. | F16K 5/0647 |
| | | | | 251/315.16 |
| 7,631,662 | B2 | 12/2009 | Reck | |
| 8,375,991 | B2 | 2/2013 | Erhardt | |
| 8,522,814 | B2 | 9/2013 | Kempf et al. | |
| 8,684,330 | B2 * | 4/2014 | Collado | F16K 25/00 |
| | | | | 251/149.6 |
| 8,770,223 | B2 | 7/2014 | Reck | |
| 9,061,223 | B2 | 6/2015 | Winborn | |
| 10,036,481 | B2 * | 7/2018 | Reck | F16K 27/067 |
| 10,458,662 | B2 | 10/2019 | Olsen et al. | |
| 10,982,419 | B2 * | 4/2021 | Baker | E03C 1/0408 |
| 11,384,872 | B1 | 7/2022 | Ericksen | B29C 66/543 |
| 11,408,153 | B1 | 8/2022 | Mason | |
| 11,913,569 | B1 * | 2/2024 | Mason | F16K 15/063 |
| 2004/0061089 | A1 * | 4/2004 | Payne | F16L 55/07 |
| | | | | 251/156 |
| 2004/0124386 | A1 | 7/2004 | Carey | |
| 2006/0180218 | A1 * | 8/2006 | Gruener | F16K 5/0647 |
| | | | | 251/315.01 |
| 2006/0196567 | A1 * | 9/2006 | Gruener | F16K 5/0647 |
| | | | | 251/315.01 |
| 2008/0214466 | A1 | 9/2008 | Cedarbaum | |
| 2008/0314466 | A1 * | 12/2008 | Cimberio | F16K 11/20 |
| | | | | 137/883 |
| 2008/0318079 | A1 * | 12/2008 | Ballantyne | F16L 13/0254 |
| | | | | 137/454.2 |
| 2010/0018911 | A1 | 1/2010 | VanZeeland | |
| 2011/0073201 | A1 | 3/2011 | Matsui et al. | |
| 2014/0261725 | A1 * | 9/2014 | Karamanos | G01M 3/26 |
| | | | | 137/15.01 |
| 2014/0264116 | A1 * | 9/2014 | Cappadora | F16L 13/08 |
| | | | | 285/133.11 |
| 2016/0069483 | A1 * | 3/2016 | Bobo | F16K 25/005 |
| | | | | 285/179 |
| 2016/0084398 | A1 * | 3/2016 | Reck | F16K 27/067 |
| | | | | 251/315.1 |
| 2016/0097550 | A1 | 4/2016 | Karamanos | |
| 2017/0089592 | A1 * | 3/2017 | Olsen | F16K 27/067 |
| 2019/0032801 | A1 | 1/2019 | Andersson | |
| 2019/0154160 | A1 * | 5/2019 | Yoder | F16K 27/107 |
| 2019/0170264 | A1 * | 6/2019 | Roy, Jr. | F16K 5/06 |
| 2019/0226592 | A1 | 7/2019 | Hussein et al. | |
| 2020/0300395 | A1 * | 9/2020 | Paige | F16L 21/02 |
| 2020/0355294 | A1 * | 11/2020 | Bobo | F16K 31/602 |
| 2020/0355394 | A1 * | 11/2020 | Karamanos | B23P 15/26 |
| 2021/0025030 | A1 * | 1/2021 | Lawrence | C22C 9/04 |
| 2021/0131576 | A1 * | 5/2021 | Roy, Jr. | F16K 5/08 |
| 2022/0034432 | A1 * | 2/2022 | Lawrence | C22C 9/04 |
| 2022/0186479 | A1 * | 6/2022 | Hisashuku | F16L 59/163 |
| 2022/0196166 | A1 | 6/2022 | Mason et al. | |

FOREIGN PATENT DOCUMENTS

| | | |
|---|---|---|
| GB | 2509714 | 7/2014 |
| JP | H07301351 | 11/1995 |

OTHER PUBLICATIONS

Webstone, Pro-Pal Series Union Ball Drain, www.webstonevalves.com/default.aspx?page=customer&file=customer/wecoin/customerpages/unionballdrain.htm (2020).

Webstone, Pro-Pal Series, Primary Secondary Purge Tee, www.webstonevalves.com/default.aspx?page=customer&file=customer/wecoin/customerpages/purgetee.htm (2020).

* cited by examiner

DUAL UNION DRAIN VALVE WITH REVERSIBLE CHECK INSERTS

BACKGROUND OF THE INVENTION

The present invention relates to a dual union drain valve with reversible check valve inserts that can be used in plumbing systems. Drain valves can be used to drain fluid from a plumbing system, including associated attachments such as water heaters, heating systems, boilers, filtration units, or appliances. Typically, the use of a drain valve requires multiple components in order to attach the drain valve to the plumbing system and/or to associated attachments. Indeed, the variety of fittings on such plumbing system/attachment components requires multiple parts for the installation of a drain valve. Moreover, the positioning of the drain valve in a desired horizontal or vertical orientation can be difficult due to space constraints. In addition, it is sometimes desired to prevent backflow and/or water hammers within a plumbing system, especially adjacent to appliances, heating and cooling components, or exterior faucets.

Thus, a dual union drain valve that can be coupled to any style of incoming and outgoing fitting in any orientation with components to prevent backflow would be advantageous.

SUMMARY OF THE INVENTION

One aspect of the present invention is a dual union drain valve. The dual union drain valve has a tee-shaped valve body having a fluid passageway between a first end, a second end, and a third end. The second end is a disposed perpendicular to the first end and the third end. A valve assembly is disposed adjacent to the third end. The valve assembly has a ball that is positioned within the fluid passageway. A first fitting has an internal shoulder and a first union coupling that has an internal threaded surface that couples with an external threaded surface on the first end. A second fitting has an internal shoulder and a second union coupling that has an internal threaded surface that couples with an external threaded surface on the second end. The dual union drain valve has a first check valve insert with an inlet and an outlet, positioned in the first fitting. At least a portion of the first check valve insert is in contact with at least a portion of the internal shoulder on the first fitting. The dual union drain valve has a second check valve insert with an inlet and an outlet, positioned in the second fitting. At least a portion of the second check valve insert is in contact with at least a portion of the internal shoulder on the second fitting.

Another aspect of the present invention is a dual union drain valve assembly. The dual union drain valve assembly has a tee-shaped valve body with a fluid passageway between a first end, a second end, and a third end, wherein the second end is a disposed perpendicular to the first end and the third end. A valve assembly is disposed adjacent to the third end. The valve assembly including a ball that is positioned within the fluid passageway. The dual union drain valve assembly has a first fitting and a first union coupling with an internal threaded surface that couples with an external threaded surface on the first end. The dual union drain valve has a second fitting and a second union coupling with an internal threaded surface that couples with an external threaded surface on the second end. The dual union drain valve has a first check valve insert with an inlet and an outlet. The first check valve insert has an external sealing member that contacts a portion of an inner surface of the first fitting.

Yet another aspect of the present invention is a plumbing system with a dual union drain valve assembly. The dual union valve assembly has a tee-shaped valve body having a fluid passageway between a first end, a second end, and a third end, wherein the second end is a disposed perpendicular to the first end and the third end. A valve member is disposed adjacent to the third end and includes a ball that is positioned within the fluid passageway. The dual union valve assembly has a first fitting with an internal shoulder. The first fitting is coupled to a pipe. A first union coupling couples with an external threaded surface on the first end to couple the first fitting to the first end. A second fitting has an internal shoulder. The second fitting is also coupled to a pipe. A second union coupling couples with an external threaded surface on the second end to couple the second fitting to the second end. A first check valve insert has an inlet and an outlet and is positioned in the first fitting. At least a portion of the first check valve insert is in contact with at least a portion of the internal shoulder on the first fitting. A second check valve insert has an inlet and an outlet and is positioned in the second fitting. At least a portion of the second check valve insert is in contact with at least a portion of the internal shoulder on the second fitting.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in Figures. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
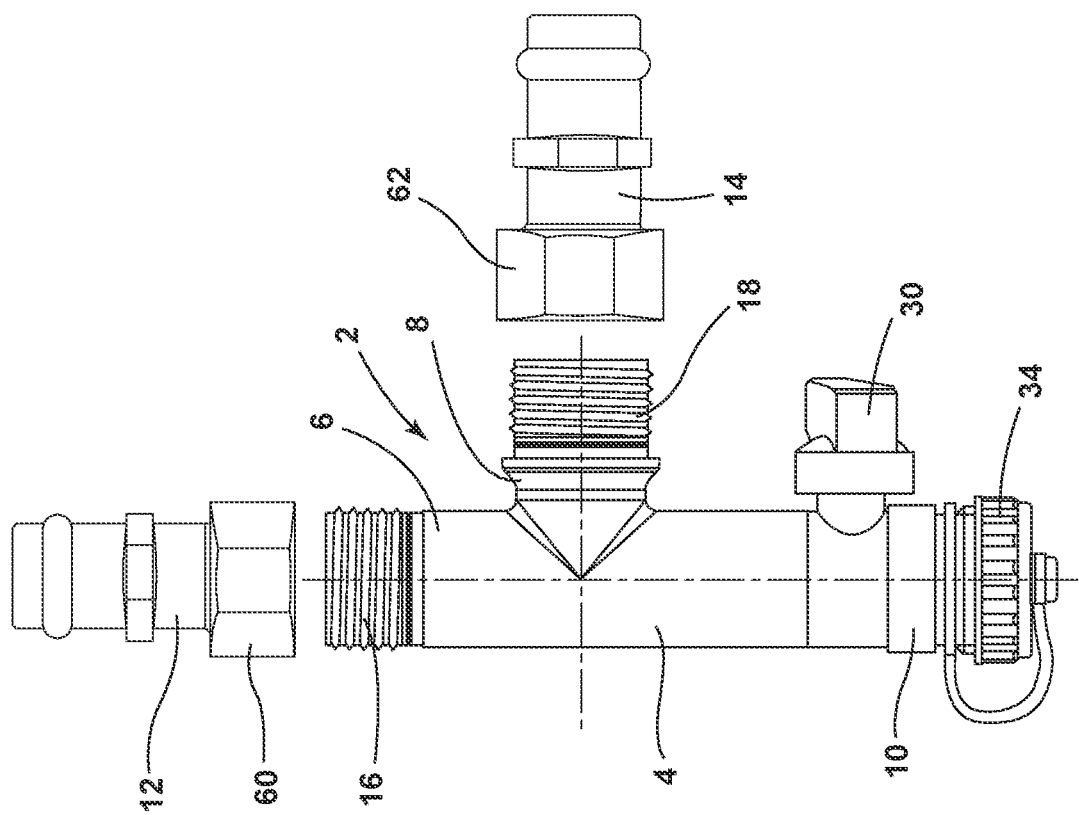
FIG. 1 is a front view of the dual union drain valve assembly, with the fitting ends separate from the valve body.
Figure 2:
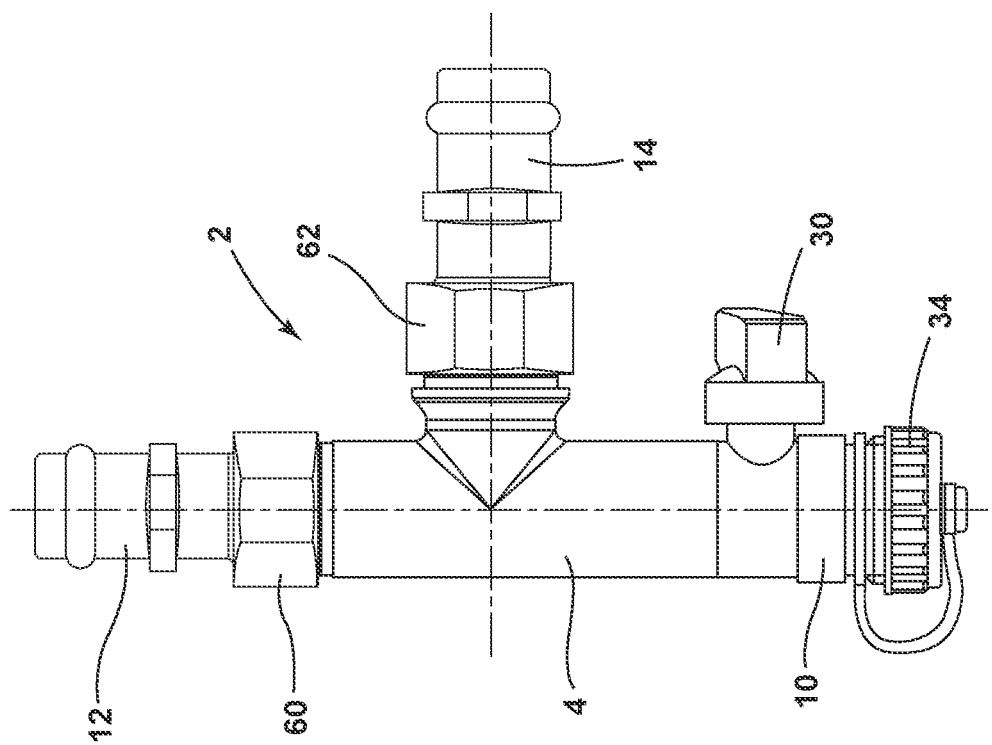
FIG. 2 is a front view of the dual union drain valve assembly with the fitting ends coupled to the valve body.
Figure 3:
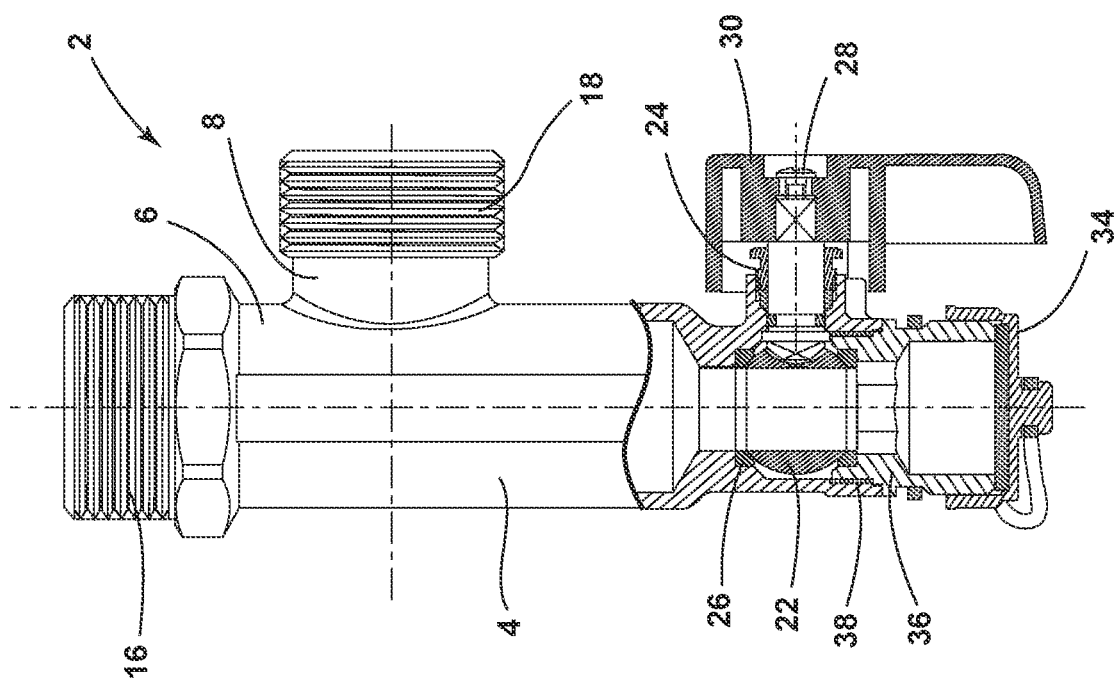
FIG. 3 is a partial cross-sectional front view of the dual union drain valve assembly shown in FIG. 1.
Figure 4:
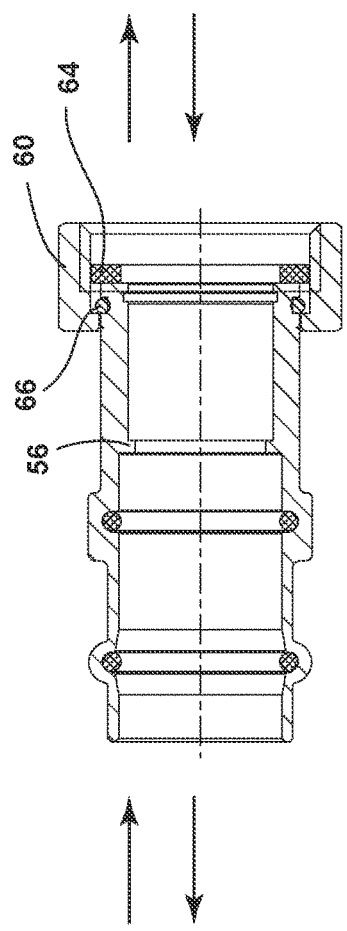
FIG. 4 is a cross-sectional view of a fitting end.
Figure 5:
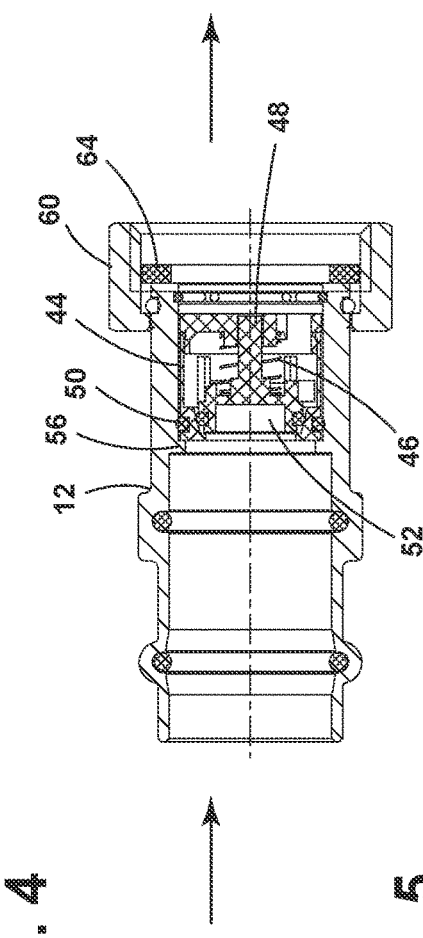
FIG. 5 is a cross-sectional view of a fitting end with a check valve insert.
Figure 6:
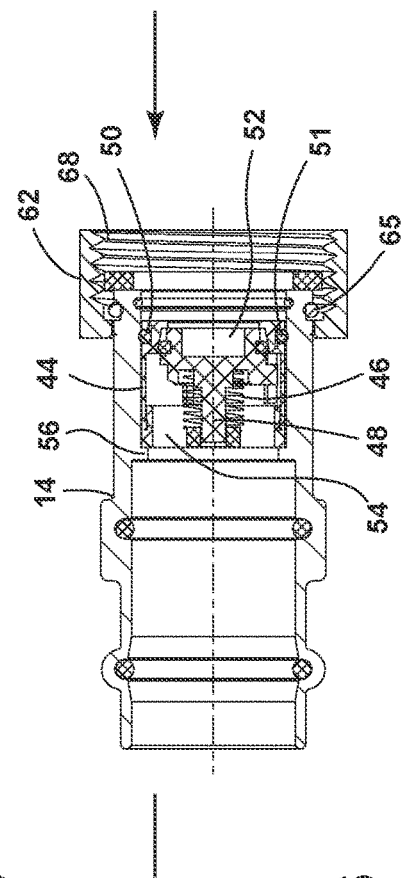
FIG. 6 is a cross-sectional view of the fitting end with the check valve insert reversed from the orientation shown in FIG. 5.
Figure 7:
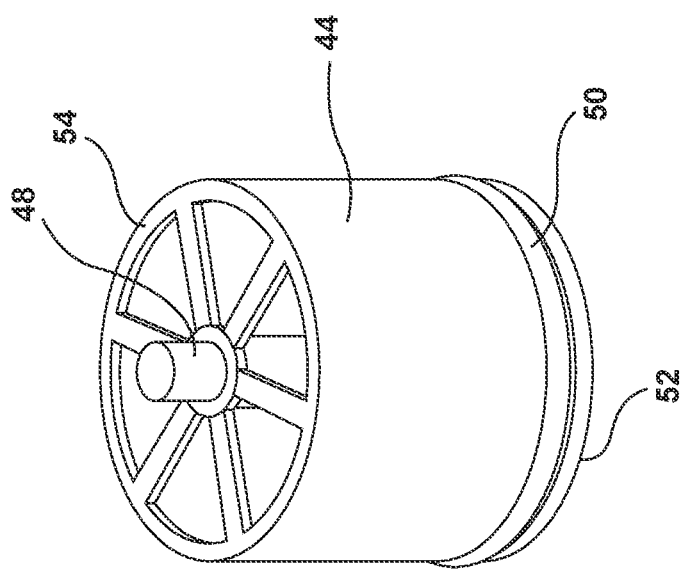
FIG. 7 is a perspective side view of a check valve insert.

A dual union drain valve assembly 2 is illustrated in FIG. 1. The dual union drain valve assembly 2 has a valve body 4 with a first end 6, a second end 8, and a third end 10. The valve body 4 is tee shaped and has an intersection in the fluid passageway where the perpendicular sections of the valve body 4 intersect. The first end 6 and third end 10 are positioned opposite each other, with the second end 8 being positioned perpendicular to the first end 6 and third end 10.

Figure 8:
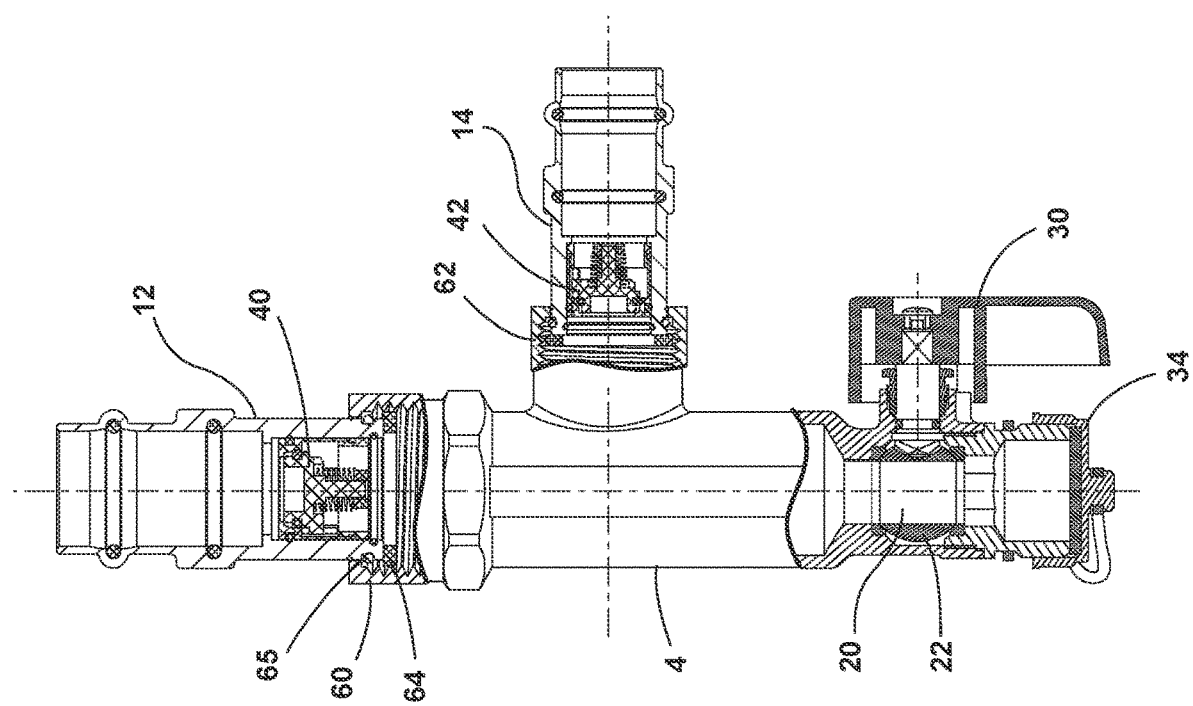
FIG. 8 is a partial cross-sectional front view of the dual union drain valve assembly shown in FIG. 2 with two check valve inserts.

The first end 6 includes a threaded exterior surface 16 as shown in FIG. 1. The second end 8 also has a threaded exterior surface 18. A first fitting 12 can be coupled to the first end 6 by a first union coupling 60. The first union coupling 60 has a threaded internal surface that couples to the threaded exterior surface 16 as shown in FIG. 8. Similarly, a second fitting 14 can be coupled to the second end 8 by a second union coupling 62. The second union coupling 62 has a threaded internal surface that couples to the threaded exterior surface 18 at the second end 8.

In the illustrated embodiments, the first fitting 12 and the first union coupling 60 are shown as separate pieces. However, the first fitting end 12 and the first union coupling 60 may be a single piece. Similarly, the second fitting 14 and the second union coupling 62 may be a single piece or separate pieces.

A sealing member 64 may be used between a surface of the ends (6, 8) and a surface of the fittings (12, 14) as shown in FIG. 8. Such a sealing member 64 should be of a compressible material, such as an EPDM ring.

Figure 9:
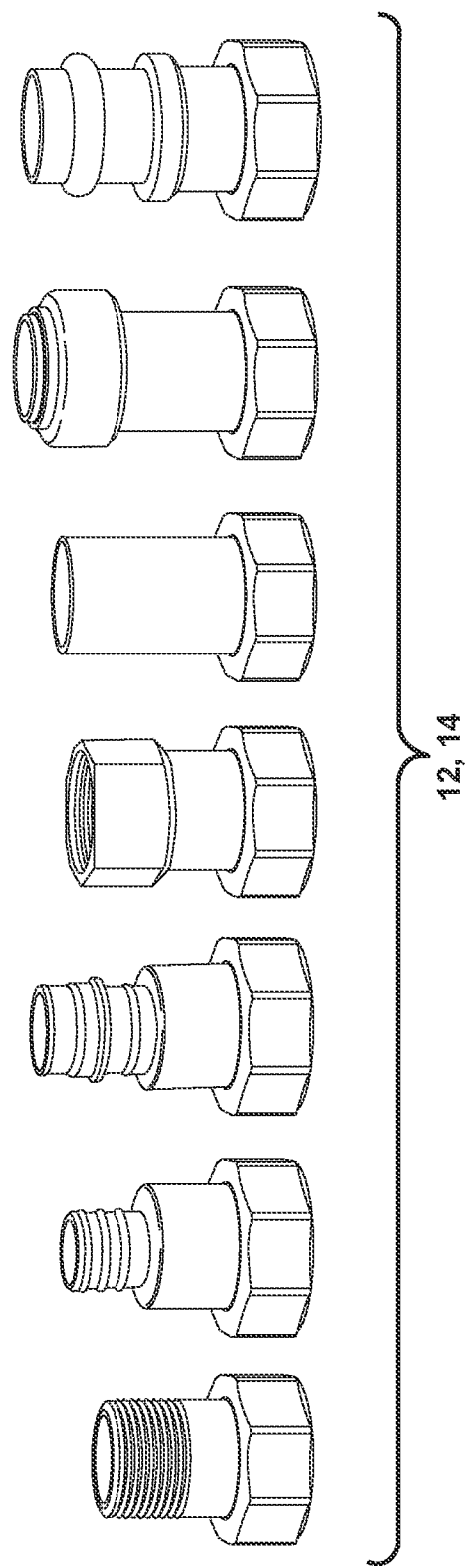
FIG. 9 is a front perspective view of various fitting ends.

A variety of fittings can be used as the first fitting 12 and/or second fitting 14. Examples of such fittings are shown in FIG. 9, including, from left to right, male iron pipe (MIP), PEX, PEX, female iron pipe (FIP), sweat, push-to-connect, and press. The first fitting 12 can be the same type of fitting as the second fitting 14 or the fittings may be different and/or different sizes.

The dual union drain valve assembly 2 has a first valve member 20. The first valve member 20 is located adjacent to the third end 10 of the valve body 4. The first valve member 20 has a ball 22 that is positioned within the fluid passageway. The ball 22 is coupled to a stem 24. The ball 22 is sealed within the fluid passageway by ball seals 26. The stem 24 is positioned within the stem boss on the valve body 4. A handle 30 is coupled to the stem 24 by a fastener 28.

The valve member 20 is positioned in or adjacent to the third end 10 of the valve body 4. The third end 10 includes a drain end with a cap 34. In the illustrated embodiment, the drain end is a separate bonnet 36 that is coupled to the third end 10 adjacent to the valve member 20. One or more sealing members 38 may be positioned between the bonnet 36 and the third end 10 of the valve body 4 in order to seal and couple the bonnet 36 to the valve body 4. Alternatively, the drain may be integrally formed with the valve body 4 or as part of the third end 10 rather than as a separate bonnet.

The dual union drain valve assembly 2 can include one or more check valves. In the illustrated embodiments shown in FIG. 8, two check valves are used in the dual union drain valve assembly 2. The first check valve insert 40 is positioned within the first fitting 12. The first check valve insert 40 contacts an internal shoulder 56 on the inside of the first fitting 12. Similarly, a second check valve insert 42 is inserted into the second fitting 14 and contacts an internal shoulder 56 on the inside of the second fitting 14.

The check valve inserts (40, 42) have an inlet 52 and an outlet 54. The check valve inserts (40, 42) have a body 44 with an internal seal 50 that contacts an internal surface of the fitting (12, 14). The check valve inserts (40, 42) have internal spring members 46 that help move the valve disk 48 to seal against the body 44. The check valve inserts (40, 42) only permit flow from the inlet 52 towards the outlet 54. The fluid entering the inlet 52 can compress the spring 46, separating the valve disk 48 from the body 44 permitting flow out of the outlet 54. The spring member 46 prevents the valve disk 48 from separating from the body 44 when there is fluid pressure exerted from the outlet 54 side of the check valve insert (40, 42). Thus, the check valve inserts (40, 42) only permit flow from the inlet 52 toward the outlet 54 and prevent backflow from the piping connected to the fitting (12, 14) adjacent to the outlet 54.

The check valve inserts (40, 42) are reversible, allowing the dual union drain valve assembly 2 to permit a variety of flow paths between the first end 6, second end 8, and third end 10. This may be desired depending upon the orientation of the dual union drain valve assembly 2 and what appliances and/or plumbing components are coupled to the plumbing system near the dual union drain valve assembly 2.

The embodiment illustrated in FIG. 8 shows a dual union drain valve assembly 2 where the fluid will enter into the dual union drain valve assembly 2 from the first fitting 12 and exit only via the drain port on third end 10, depending upon whether the valve member 20 is open or closed, and the second fitting 14. The arrangement shown in the embodiment illustrated in FIG. 8 will prevent backflow from the dual union drain valve assembly 2 into the piping coupled to the first fitting 12 and will prevent backflow into the dual union drain valve assembly 2 from the piping coupled to the second fitting 14. The orientation of each of the check valve inserts (40, 42) could be reversed, permitting flow into the dual union drain valve assembly 2 from the second fitting 14 instead of the first fitting 12. In addition, the dual union drain valve assembly 2 could use no check valve inserts or a single check valve insert depending upon the desired to prevent backflow or water hammers to surrounding components in the plumbing system.

The use of union couplings (60, 62) permit the first fitting 12 and/or second fitting 14 to be easily removed from the valve body 4. This permits the removal, replacement, and/or reversal of any check valve insert used in a fitting. In addition, the decoupling of the fittings (12, 14) permits the replacement of the valve body 4 if necessary. The use of the bonnet 36 permits easy access to the components of valve member 20 should the ball 22 and/or seals 26 need to be replaced.

In the illustrated embodiment, the valve body 4 is made of brass. The brass may be a dezincification-resistant (DZR) brass alloy. The bonnet 36 may be made of a similar or different material as the valve body 4. The sealing members may be made of any compressible material, including, but not limited to, EPDM.

The dual union drain valve assembly 2 may be used adjacent to an exterior faucet. This is especially effective when the plumbing system adjacent to the exterior faucet needs to be drained and there is a need to prevent fluid from entering from the exterior faucet into the building.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A plumbing system with a dual union drain valve assembly, comprising:
   a tee-shaped valve body having a fluid passageway between a first end, a second end, and a third end, wherein said second end is disposed perpendicular to said first end and said third end;
   a valve assembly disposed adjacent to said third end, said valve assembly including a ball that is positioned within said fluid passageway;
   a first fitting having an internal shoulder, said first fitting coupled to a pipe;
   a first union coupling having an internal threaded surface that couples with an external threaded surface on said first end;
   a second fitting having an internal shoulder, said second fitting coupled to a pipe;
   a second union coupling having an internal threaded surface that couples with an external threaded surface on said second end;
   a first check valve insert having an inlet and an outlet, positioned in said first fitting wherein at least a portion of said first check valve insert is in contact with at least a portion of said internal shoulder on said first fitting; and
   a second check valve insert having an inlet and an outlet, positioned in said second fitting, wherein at least a portion of said second check valve insert is in contact with at least a portion of said internal shoulder on said second fitting.

2. The plumbing assembly of claim 1, wherein the outlet of said second check valve insert is positioned toward said tee-shaped valve body to permit flow from said second end toward said first end and said third end.

3. The plumbing assembly of claim 2, wherein the outlet of said first check valve insert is positioned away from the second end and the third end of said tee-shaped valve body permitting flow of fluids out of said first end.

4. The plumbing assembly of claim 2, including a sealing member positioned between a surface of said bonnet and said tee-shaped valve body.

5. The plumbing assembly of claim 1, wherein the outlet of said first check valve insert is positioned toward said third end of said tee-shaped valve body permitting flow of fluids from said first end toward said second end and said third end.

6. The plumbing assembly of claim 5, wherein the outlet of said second check valve insert is positioned away from said tee-shaped valve body to permit flow out of said second end.

7. The plumbing assembly of claim 1, wherein the first check valve and the second check valve has an external sealing member.

8. The plumbing assembly of claim 1, wherein said third end includes a drain port that is a separate bonnet coupled to said tee-shaped valve body.

9. A dual union drain valve, comprising:
   a tee-shaped valve body having a fluid passageway between a first end, a second end, and a third end, wherein said second end is disposed perpendicular to said first end and said third end;
   a valve assembly disposed adjacent to said third end, said valve assembly including a ball that is positioned within said fluid passageway;
   a first fitting having an internal shoulder;
   a first union coupling having an internal threaded surface that couples with an external threaded surface on said first end;
   a second fitting having an internal shoulder;

a second union coupling having an internal threaded surface that couples with an external threaded surface on said second end;

a first check valve insert having an inlet and an outlet, positioned in said first fitting wherein at least a portion of said first check valve insert is in contact with at least a portion of said internal shoulder on said first fitting; and a second check valve insert having an inlet and an outlet, positioned in said second fitting, wherein at least a portion of said second check valve insert is in contact with at least a portion of said internal shoulder on said second fitting.

10. The dual union drain valve of claim 9, wherein the outlet of said first check valve insert is positioned toward said third end of said tee-shaped valve body permitting flow of fluids from said first end toward said second end and said third end.

11. The dual union drain valve of claim 10, wherein the outlet of said second check valve insert is positioned away from said tee-shaped valve body to permit flow out of said second end.

12. The dual union drain valve of claim 9, wherein the outlet of said second check valve insert is positioned toward said tee-shaped valve body to permit flow from said second end toward said first end and said third end.

13. The dual union drain valve of claim 12, wherein the outlet of said first check valve insert is positioned away from the second end and the third end of said tee-shaped valve body permitting flow of fluids out of said first end.

14. The dual union drain valve of claim 9, wherein the first check valve and the second check valve each includes a sealing member that contacts an interior surface of the first fitting and second fitting, respectively.

15. The dual union drain valve of claim 9, wherein said third end includes a drain port that is a separate bonnet coupled to said tee-shaped valve body.

16. A dual union drain valve assembly, comprising:
a tee-shaped valve body having a fluid passageway between a first end, a second end, and a third end, wherein said second end is disposed perpendicular to said first end and said third end;
a valve assembly disposed adjacent to said third end, said valve assembly including a ball that is positioned within said fluid passageway;
a first fitting;
a first union coupling having an internal threaded surface that couples with an external threaded surface on said first end;
a second fitting;
a second union coupling having an internal threaded surface that couples with an external threaded surface on said second end; and
a first check valve insert having an inlet and an outlet, said first fitting on an external sealing member contacting a portion of an inner surface of the first fitting.

17. The dual union drain valve assembly of claim 16, including a second check valve insert with a sealing member contacting a portion of an inner surface of said second fitting.

18. The dual union drain valve assembly of claim 17, wherein the outlet of said second check valve insert is positioned toward said tee-shaped valve body to permit flow from said second end toward said first end and said third end.

19. The dual union drain valve assembly of claim 16, wherein the outlet of said first check valve insert is positioned toward said third end of said tee-shaped valve body permitting flow of fluids from said first end toward said second end and said third end.

20. The dual union drain valve assembly of claim 16, wherein said third end includes a drain port that is a separate bonnet coupled to said tee-shaped valve body.

* * * * *